US010433558B2

(12) United States Patent
Froelicher et al.

(10) Patent No.: US 10,433,558 B2
(45) Date of Patent: Oct. 8, 2019

(54) OVEN APPLIANCE WITH AN AIR FLOW RESTRICTION DOOR

(71) Applicant: Haier US Appliance Solutions, Inc., Wilmington, DE (US)

(72) Inventors: Stephen Bernard Froelicher, Louisville, KY (US); Christopher James Adelmann, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 308 days.

(21) Appl. No.: 15/218,148

(22) Filed: Jul. 25, 2016

(65) Prior Publication Data

US 2018/0020679 A1  Jan. 25, 2018

(51) Int. Cl.
*A21B 1/40* (2006.01)
*A21B 1/22* (2006.01)
*A21B 3/02* (2006.01)
*A21B 3/04* (2006.01)

(52) U.S. Cl.
CPC .................. *A21B 1/40* (2013.01); *A21B 1/22* (2013.01); *A21B 3/02* (2013.01); *A21B 3/04* (2013.01)

(58) Field of Classification Search
CPC .. A21B 1/14; A21B 1/145; A21B 1/40; A21B 2/00; A21B 3/02; A21B 3/04; A47J 37/015; A47J 37/0623; A47J 37/0629; A47J 37/0641; F24B 1/187; F24B 1/189; F24B 1/192; F24C 15/02–045

USPC ............ 219/395, 398; 126/15 A, 15 R, 190; 110/173 R
See application file for complete search history.

(56) References Cited

U.S. PATENT DOCUMENTS

| 2,864,358 | A | * | 12/1958 | Harding | F24B 5/026 126/15 R |
| 3,640,333 | A | * | 2/1972 | Leclerc | E06B 3/48 16/257 |
| 3,859,979 | A | * | 1/1975 | Gilliom | F24C 14/02 126/19 R |
| 4,188,867 | A | * | 2/1980 | DeRemer | A47J 37/0623 99/385 |
| 6,788,211 | B2 | | 9/2004 | Kouznetsov et al. | |
| 2009/0008379 | A1 | * | 1/2009 | Ingemanson | A21B 1/22 219/395 |

FOREIGN PATENT DOCUMENTS

CN              2715001 Y  *  8/2004  .............. F24C 15/02

OTHER PUBLICATIONS

Machine Translation of CN 2715001Y, 2004.*

* cited by examiner

*Primary Examiner* — Tu B Hoang
*Assistant Examiner* — Erin E McGrath
(74) *Attorney, Agent, or Firm* — Dority & Manning, P.A.

(57) ABSTRACT

An oven appliance includes a cooking chamber disposed within a housing with an opening in the housing for accessing the chamber. A casing is disposed around the opening. An air flow restriction door for limiting air flow within the cooking chamber is provided.

6 Claims, 9 Drawing Sheets

OVEN APPLIANCE WITH AN AIR FLOW RESTRICTION DOOR

FIELD OF THE INVENTION

The present subject matter relates generally to oven appliances, such as pizza oven appliances.

BACKGROUND OF THE INVENTION

Pizza ovens generally include a housing that defines a cooking chamber for receiving a pizza for cooking. A typical pizza oven housing provides an opening for accessing the cooking chamber. Heating elements, such as resistance heaters, gas burners, or combusting wood, heat the cooking chamber to a suitable temperature. Certain pizza ovens operate the heating elements to heat the cooking chamber to high temperatures. For example, the operating temperatures of such pizza ovens can be higher than five hundred degrees Fahrenheit.

Heating food items within pizza ovens operating at high temperatures poses challenges. For example, the use of high operating temperature can generate smoke and other undesirable conditions.

Accordingly, a pizza oven with features for selectively limiting air flow through the pizza oven would be useful.

BRIEF DESCRIPTION OF THE INVENTION

The present subject matter provides an oven appliance with a baking stone positioned within a housing at a bottom portion of a cooking chamber. A controller is in operative communication with an upper heating element array, a lower heating element array, and one or more temperature sensors. The housing provides an opening for accessing the cooking chamber. A hollow casing is disposed around the opening, and one or more doors are provided to restrict fluid communication between the cooking chamber and the interior room ambient atmosphere. Additional aspects and advantages of the invention will be set forth in part in the following description, or may be apparent from the description, or may be learned through practice of the invention.

In a first exemplary embodiment, an oven appliance is provided. The oven appliance includes a housing that defines a cooking chamber and an opening for accessing the cooking chamber. An upper heating element array is positioned within the housing at a top portion of the cooking chamber. A baking stone is positioned within the housing at a bottom portion of the cooking chamber. A lower heating element array is positioned within the housing below the baking stone adjacent the bottom portion of the cooking chamber. A hollow casing is positioned around the opening of the housing, the casing comprises an intake contiguous with the interior room ambient atmosphere about the housing and a venting exit contiguous with the interior room ambient atmosphere about the housing. An air handler is operable to draw air from the interior room ambient atmosphere into the casing via the intake and discharge air from the casing to the interior room ambient atmosphere via the venting exit. The oven appliance also includes a temperature sensor. A door is selectively adjustable between an open position and a closed position, the door restricting fluid communication between the interior room ambient atmosphere and the cooking chamber when the door is in a closed position. A door retaining mechanism is operable to retain the door in the open position such that the door permits fluid communication between the interior room ambient atmosphere and the cooking chamber. A controller is operatively connected to the upper heating element array, the lower heating element array, the door retaining mechanism, the air handler, and the first temperature sensor, the controller is configured to receive a signal from the temperature sensor and, in response to the signal, to deactivate the upper heating element array, the lower heating element array, and the air handler and to release the door retaining mechanism.

In a second exemplary embodiment, a method of limiting air flow in an indoor oven appliance is provided. The method includes activating one or more heating arrays within a cooking chamber defined within a housing of the appliance, heating a baking stone positioned within the housing at a bottom portion of the cooking chamber, drawing air into and through the cooking chamber using an air handler positioned within a hollow casing, venting exhaust from the cooking chamber to the interior room ambient atmosphere about the housing through a venting exit of the hollow casing, sensing a temperature within the oven appliance with a temperature sensor, deactivating the one or more heating arrays when the sensed temperature reaches a threshold condition, deactivating the air handler when the sensed temperature reaches the threshold condition, and closing a door to restrict fluid communication between the cooking chamber and the interior room ambient atmosphere about the housing when the sensed temperature reaches the threshold condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is to be understood that the use of terms such as "air" or "gases" herein are not necessarily limited to specific mixtures of gases or pure air but can also include various gases, vapors, and/or byproducts, such as smoke or particulate matter, and combinations thereof. For example, references in the following to various air flow paths are not limited to air only but can also accommodate flow of various fluids, such as the foregoing examples.

Figure 1:
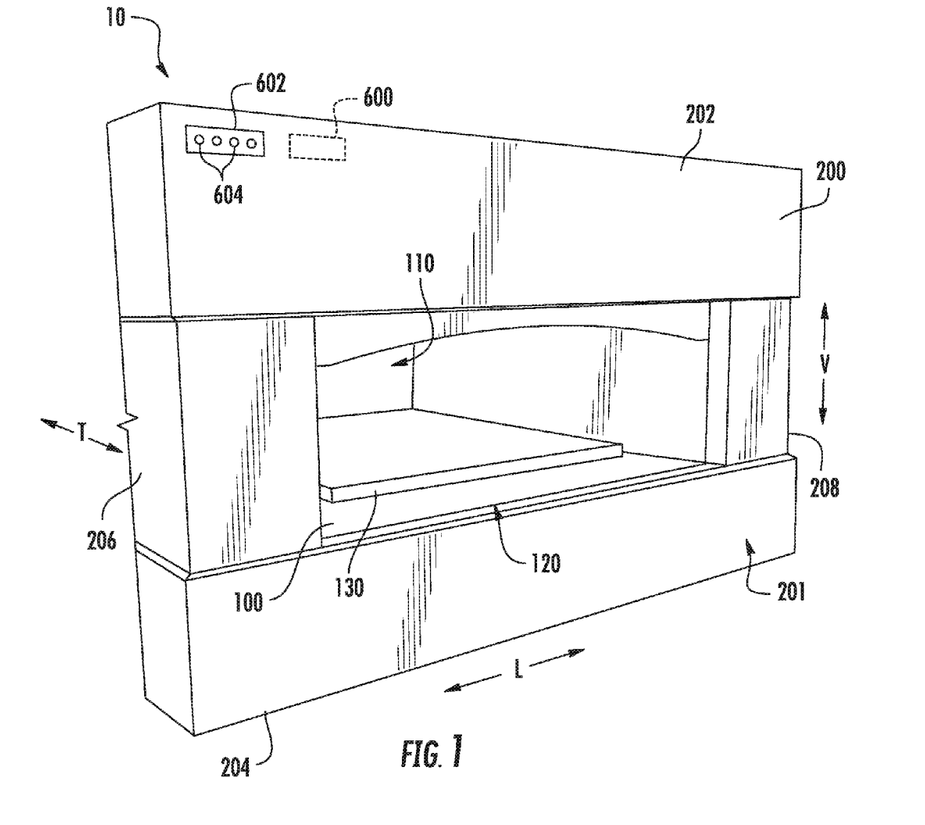
FIG. 1 provides a partial front, perspective view of an oven appliance according to an exemplary embodiment of the present subject matter.

FIG. 1 provides a partial front, perspective view of an oven appliance 10 according to an exemplary embodiment of the present subject matter. As may be seen in FIG. 1, oven appliance 10 includes a housing 100 that defines a cooking chamber 110. Cooking chamber 110 is configured for receiving food items for cooking therein. In particular, housing 100 also defines an opening 120 for accessing cooking chamber 110. Opening 120 is positioned at a front portion 102 of housing 100, and a user of oven appliance 10 may place food items into and remove food items from cooking chamber 110 via opening 120. As may be seen in FIG. 1, cooking chamber 110 is open such that cooking chamber 110 is contiguous with or exposed to ambient atmosphere about oven appliance 10, e.g., about housing 100, via opening 120. As illustrated in FIG. 1, oven appliance 10 may further comprise a controller 600 in communication with control panel 602 and user-interface elements 604.

A baking stone 130 is positioned within housing 100 at a bottom portion 114 of cooking chamber 110. Thus, baking stone 130 may form at least a portion of a floor of cooking chamber 110. Food items 500, such as pizza, may be placed directly on baking stone 130 during operation of oven appliance 10, as will be understood by those skilled in the art. Baking stone 130 may be constructed of or with any suitable material. For example, baking stone 130 may be constructed of or with a ceramic, clay or stone. In particular, baking stone 130 may be constructed of or with a porous ceramic or porous stone.

Oven appliance 10 also includes a manifold or casing 200. Casing 200 is mounted to housing 100 at opening 120 of housing 100. In particular exemplary embodiments, such as shown in FIG. 1, casing 200 may extend about opening 120 of housing 100. Thus, a user may reach through opening 120 into cooking chamber 110 at casing 200. Casing 200 may have any suitable shape and/or appearance. For example, casing 200 may be rectangular with flat elements as shown in FIG. 1. In alternative exemplary embodiments, casing 200 may include column shaped elements, rounded elements, etc. Casing 200 may be formed of or with any suitable material. For example, an outer surface 201 of casing 200 may be constructed of or with stainless steel, painted steel, enameled steel, copper or combinations thereof.

Figure 2:
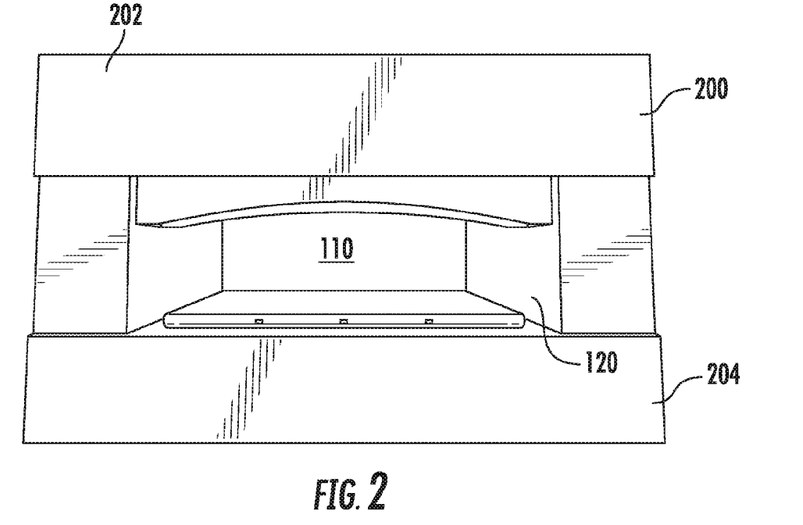
FIG. 2 provides a front elevation view of an exemplary oven appliance.
Figure 3:
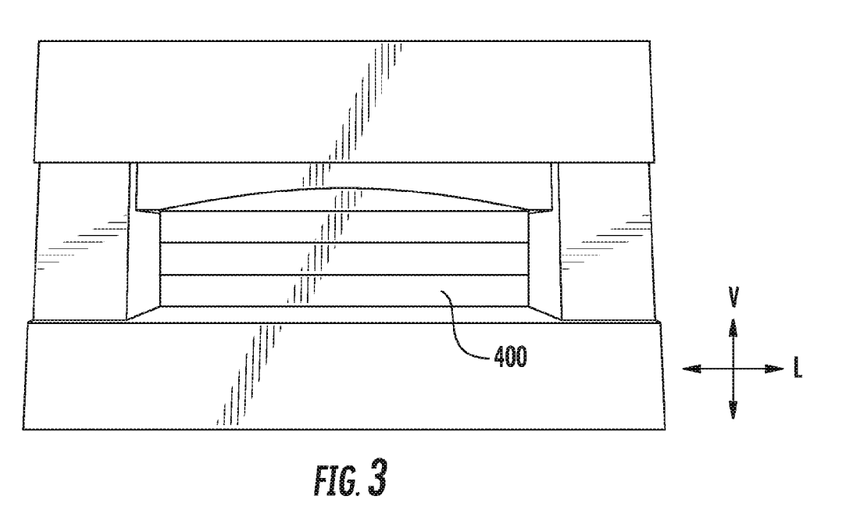
FIG. 3 provides a front elevation view of an exemplary oven appliance wherein an exemplary air flow suppression door has been deployed.
Figure 6:
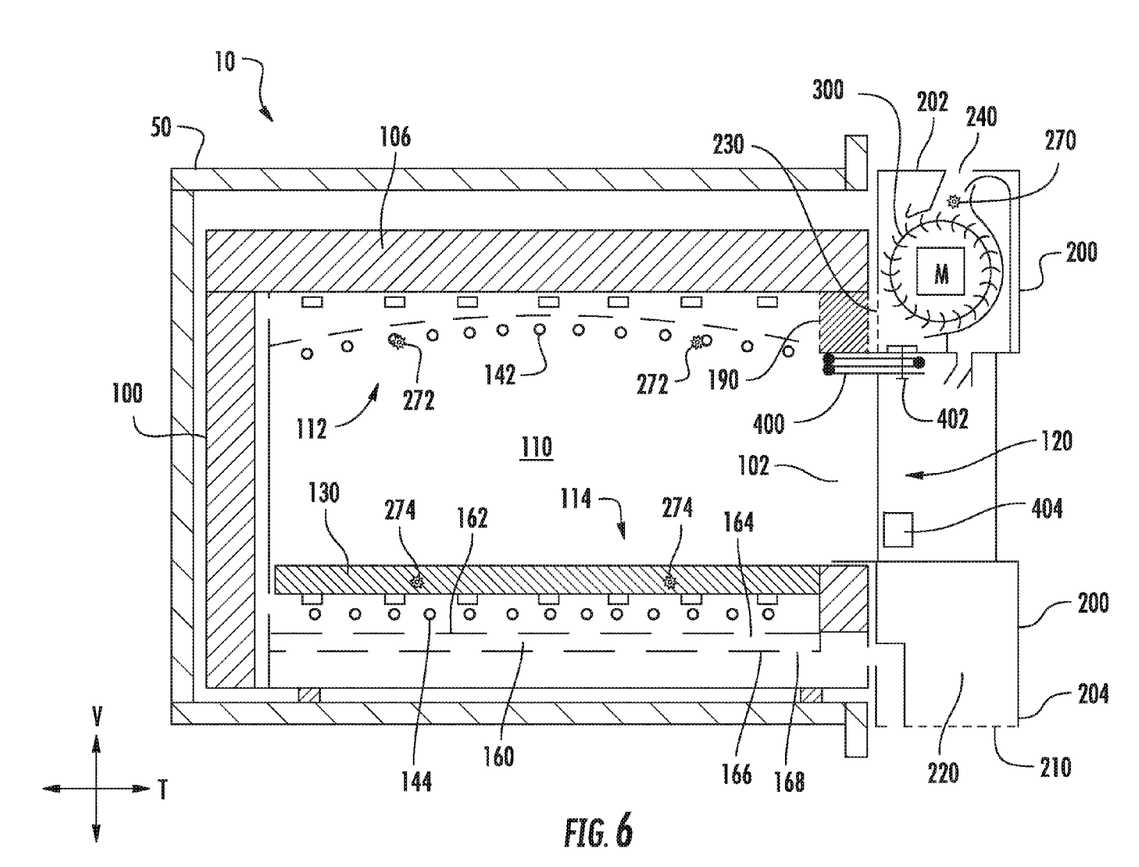
FIG. 6 provides a side section view of an exemplary embodiment of the oven appliance positioned within a cabinet.

FIG. 2 provides a front elevation view of an exemplary embodiment of oven appliance 10, wherein an undesirable condition has occurred within cooking chamber 110. FIG. 3 provides a front elevation view of an exemplary embodiment of oven appliance 10 wherein a drop-down air flow restriction door 400 has been deployed to seal the opening 120 and suppress the undesirable condition within cooking chamber 110. FIG. 6 provides a side section view of oven appliance 10 positioned within a cabinet 50. As may be seen, e.g., in FIGS. 1, 2, 3, and 6, oven appliance 10 defines a vertical direction V, a lateral direction L and a transverse direction T. The vertical direction V, the lateral direction L and the transverse direction T are mutually perpendicular and form an orthogonal direction system. Various features of oven appliance 10 are discussed in greater detail below in the context of the several FIGS.

Oven appliance 10 includes heating element arrays for heating cooking chamber 110 and food items therein. In particular, an upper heating element array 142 is positioned within housing 110 at a top portion 112 of cooking chamber 110. In addition, a lower heating element array 144 is positioned within housing 110 below baking stone 130 adjacent bottom portion 114 of cooking chamber 110. Thus, lower heating element array 144 may not be directly exposed to cooking chamber 110, and baking stone 130 may be positioned between cooking chamber 110 and lower heating element array 144, e.g., along the vertical direction V. In the illustrated examples, upper and lower heating element arrays 142, 144 are electrical heating element arrays. In certain exemplary embodiments, upper and lower heating element arrays 142, 144 are constructed of or with electrical resistance heating elements, such as calrods.

Figure 4:
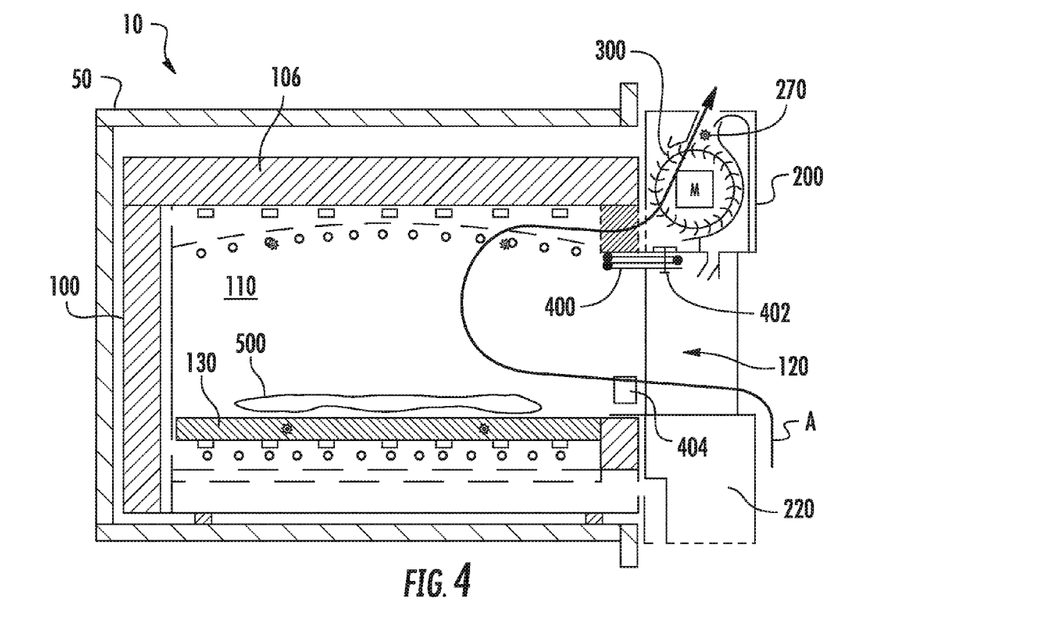
FIG. 4 provides a side section view of the exemplary oven appliance of FIG. 2.

Oven appliance 10 includes various features for limiting or reducing heat transfer from cooking chamber 110 to cabinet 50. In the example illustrated in FIG. 4, oven appliance 10 includes insulation 106 within housing 100, e.g., such that housing 100 is an insulated housing. Also as illustrated in FIG. 4, insulation 106 is positioned between cooking chamber 110 and cabinet 50. Oven appliance 10 can also include a baffle 160 positioned within housing 100 below lower heating element array 144. In such exemplary embodiments, baffle 160 limits or reduces heat transfer between lower heating element array 144 and a floor of cabinet 50. In the example illustrated in FIG. 4, baffle 160 includes an upper plate 162 and a lower plate 166. Upper plate 162 and lower plate 166 are spaced apart from each other, e.g., along the vertical direction V. In some exemplary embodiments, upper plate 162 defines a plurality of holes 164, and lower plate 166 also defines a plurality of holes 168. Thus, a thermal break may be formed between upper plate 162 and lower plate 166, e.g., along the vertical direction V.

As discussed above, casing 200 is mounted to housing 100. As may be seen in FIG. 4, casing 200 includes an upper portion 202, a lower portion 204, and one or more side portions 206, 208. Casing 200 may be at least partially hollow to define a plenum space 220 therein. Air handler 300 may be housed within plenum space 220, in the illustrated exemplary embodiments air handler 300 is located in upper portion 202 of casing 200 proximate the smoke inlet 230 and venting exit 240. However, it is readily understood by those skilled in the art that various different configurations of the air handler 300 and casing 200 are also possible without departing from the scope of the present subject matter.

As illustrated in FIGS. 1-3, in some exemplary embodiments oven appliance 10 may include casing 200 comprising an upper portion 202, a lower portion 204, and one or more side portions 206, 208 extending vertically between the upper and lower portions 202 and 204. Additionally, as illustrated in, e.g., FIG. 6, some exemplary embodiments can include air handler 300 in upper portion 202 of casing 200. Air handler 300 is operable to draw ambient air into and through the oven appliance 10, particularly through the cooking chamber 110, and is operable to draw cooking byproducts, such as cooking fumes and/or smoke, into smoke inlet 230 of casing 200. Air handler 300 may draw air into cooking chamber 110 via opening 120 and into plenum space 220 at lower portion 204 via inlets 210, and plenum space 220 at lower portion 204 is also in fluid communication with smoke inlet 230 via cooking chamber 110. Thus, air handler 300 may be provided to actively draw cooking byproducts into casing 200.

Oven appliance 10 further includes features for assisting with venting cooking byproducts into the ambient atmosphere about oven appliance 10. In particular exemplary embodiments, such as illustrated in FIG. 4, casing 200 may define a smoke inlet 230 and a venting exit 240. Fumes and other cooking byproducts emanating from cooking chamber 110 of housing 100 rise to upper portion 112 of cooking chamber 110 and exit cooking chamber 110 through smoke reduction catalyst 190 and smoke inlet 230 to venting exit 240 and into the ambient atmosphere about housing 100. Venting exit 240 permits oven appliance 10 to vent cooking byproducts into an interior atmosphere of a building housing oven appliance 10. Thus, oven appliance 10 need not include or be coupled to venting ducts that direct cooking byproducts to an exterior atmosphere outside of the building housing oven appliance 10. Oven appliance 10 also includes features for treating the cooking byproducts, as discussed in greater detail below.

As may be seen in, e.g., FIG. 6, oven appliance 100 includes a smoke reduction catalyst 190. Smoke reduction catalyst 190 is positioned between the cooking chamber 110 and smoke inlet 230 of casing 200. Smoke reduction catalyst 190 is configured for reacting with, e.g., cooking fumes and/or smoke in order to reduce emission of undesirable material from venting exit 240 during normal operation of oven appliance 10. Smoke reduction catalyst 190 may be any suitable smoke reduction catalyst. For example, smoke reduction catalyst 190 may include ceramic plates coated with a noble (non-reactive) metal, such as palladium. The ceramic plates of smoke reduction catalyst 190 may form a honeycomb or other suitable high surface area pattern.

As illustrated in FIGS. 2 and 3, if oven appliance is operating outside of normal parameters, e.g., if there is an undesirable condition in cooking chamber 110, a drop-down door 400 is provided that can seal off opening 120 to limit air flow through the opening 120. As will be discussed in more detail below, the door can be deployed by a controller 600 in response to an indication of operation outside of normal parameters, and such parameters can include temperature, e.g., exceeding a maximum temperature or increasing at a rate faster than a maximum temperature increase rate.

Figure 5:
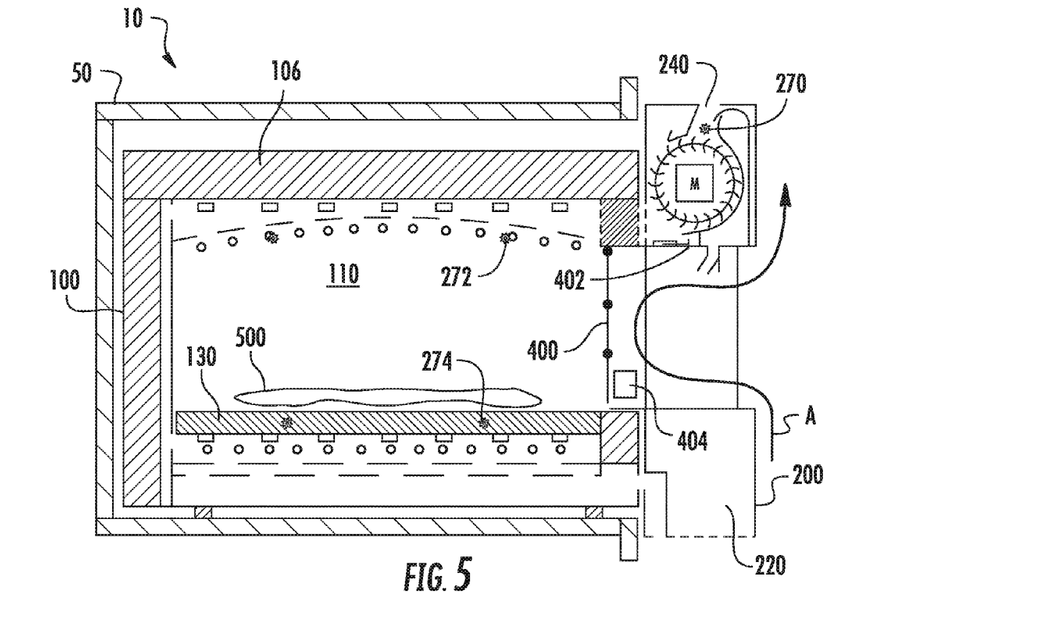
FIG. 5 provides a side section view of the exemplary oven appliance of FIG. 3.

FIGS. 4 and 5 illustrate further details that may be provided in various exemplary embodiments described herein. As noted above, during normal operation of oven appliance 10, cooking chamber 110 is open such that cooking chamber 110 is contiguous with or exposed to ambient atmosphere about oven appliance 10, e.g., about housing 100, via opening 120. During normal operation, door 400 is held in an open position by door retaining mechanism 402, e.g., as illustrated in FIG. 4. Also as illustrated in FIG. 4, if food 500 becomes overheated, air (represented by arrow "A") can continue to flow into cooking chamber 110 and feed the undesirable condition within the cooking chamber 110. As illustrated in FIG. 5, door retaining mechanism 402, which is illustrated as a latch with an actuator in FIGS. 4 and 5 but may also be provided, e.g., as a pin, can be released so that door 400 will close. Also, in some exemplary embodiments, such as illustrated in FIG. 5, door locking mechanism 404 can be provided to ensure that door 400 is not re-opened too soon, e.g., before the undesirable condition has been eliminated. Door locking mechanism can be provided as, e.g., a spring-loaded latch. Optionally, some exemplary embodiments of door locking mechanism 404 can be configured to require a tool or a key to unlock. In some exemplary embodiments, the door locking mechanism 404 can be operatively connected with an actuator, such as a solenoid switch, and the actuator can be controlled by controller 600.

Figure 7:
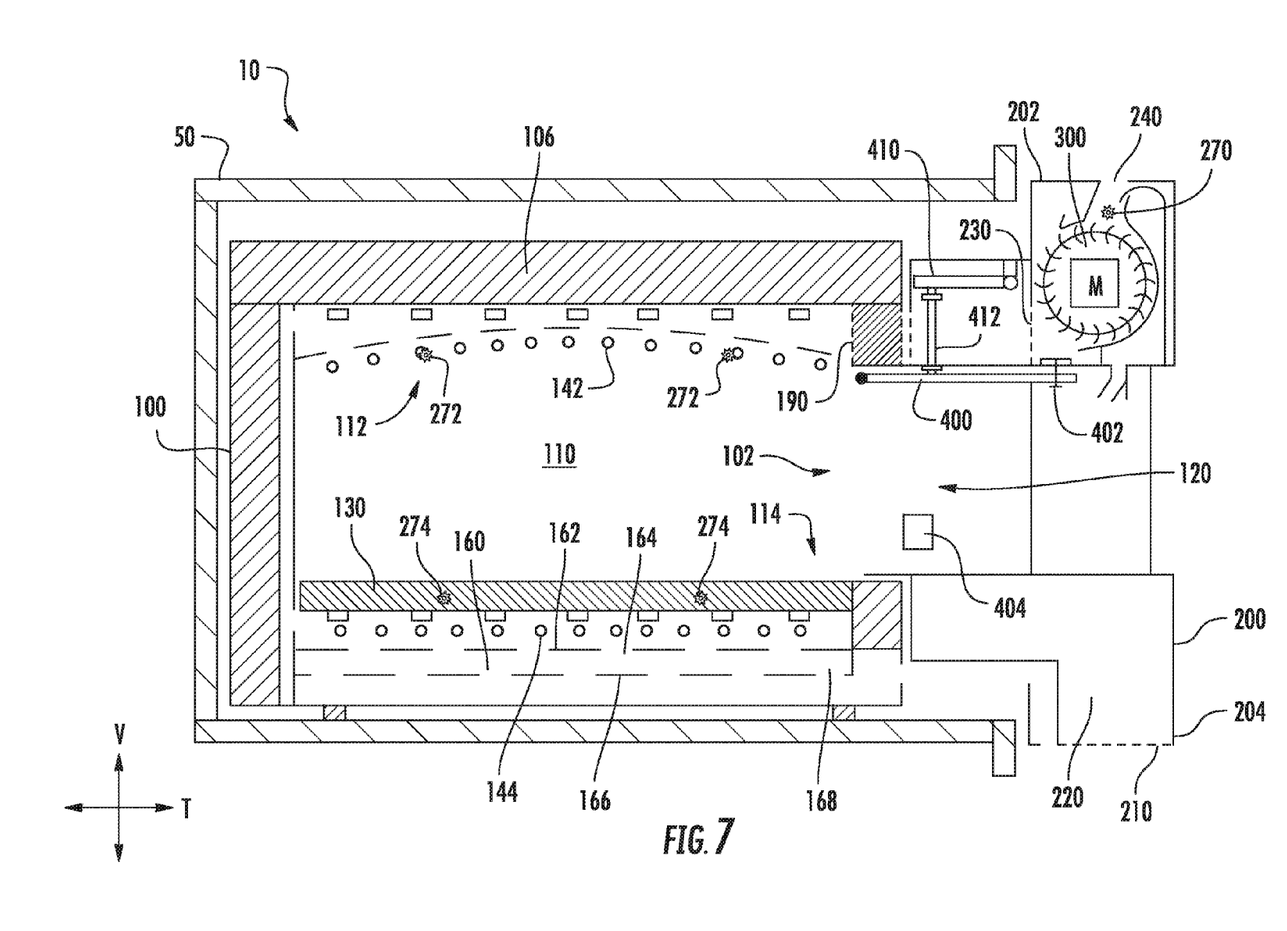
FIGS. 7 and 8 provide side section views of another exemplary embodiment of the oven appliance positioned within a cabinet.
Figure 8:
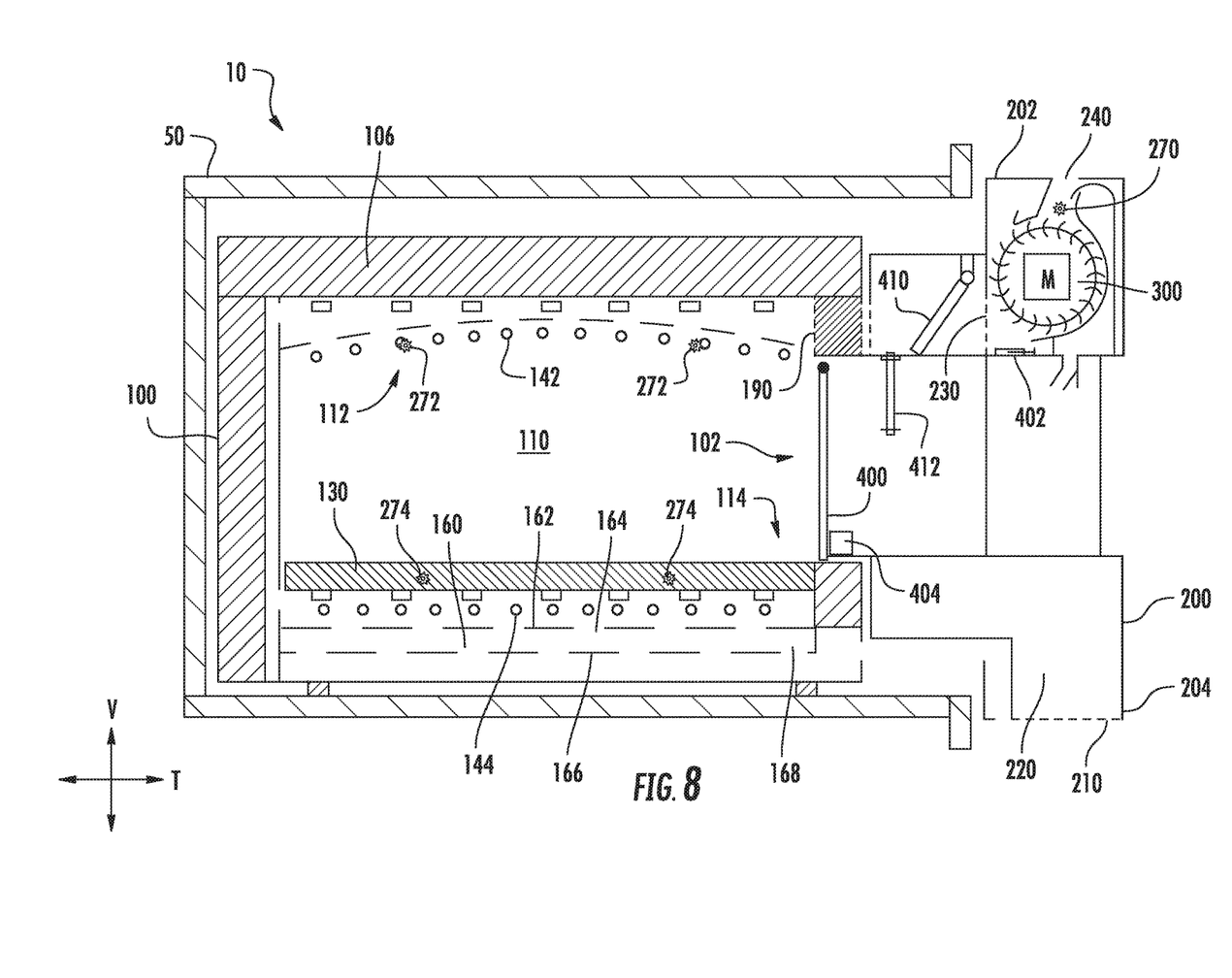

FIG. 6 provides further illustration of features found in certain exemplary embodiments, such as drop-down door 400 which is illustrated in FIG. 6 as a hinged multi-panel door which folds up in the open position. FIG. 7 illustrates features found in some exemplary embodiments, such as door 400 is a single-panel door pivotally coupled to housing 100, e.g., with a hinge, and held up in the open position by door retaining mechanism 402, which is illustrated as a latch in this example. Also illustrated in FIG. 7 is second door 410, which can also be provided as a single-panel swinging door, and second door 410 is held open by second door retaining mechanism 412. In exemplary embodiments, such as illustrated in FIG. 7, second door retaining mechanism 412 is a pin which is held up by door 400 such that, as illustrated in FIG. 8, when door retaining mechanism 402 releases door 400, pin 412 is released from door 400 and pin 412 in turn releases second door 410 to seal off the smoke inlet 230.

Figure 9:
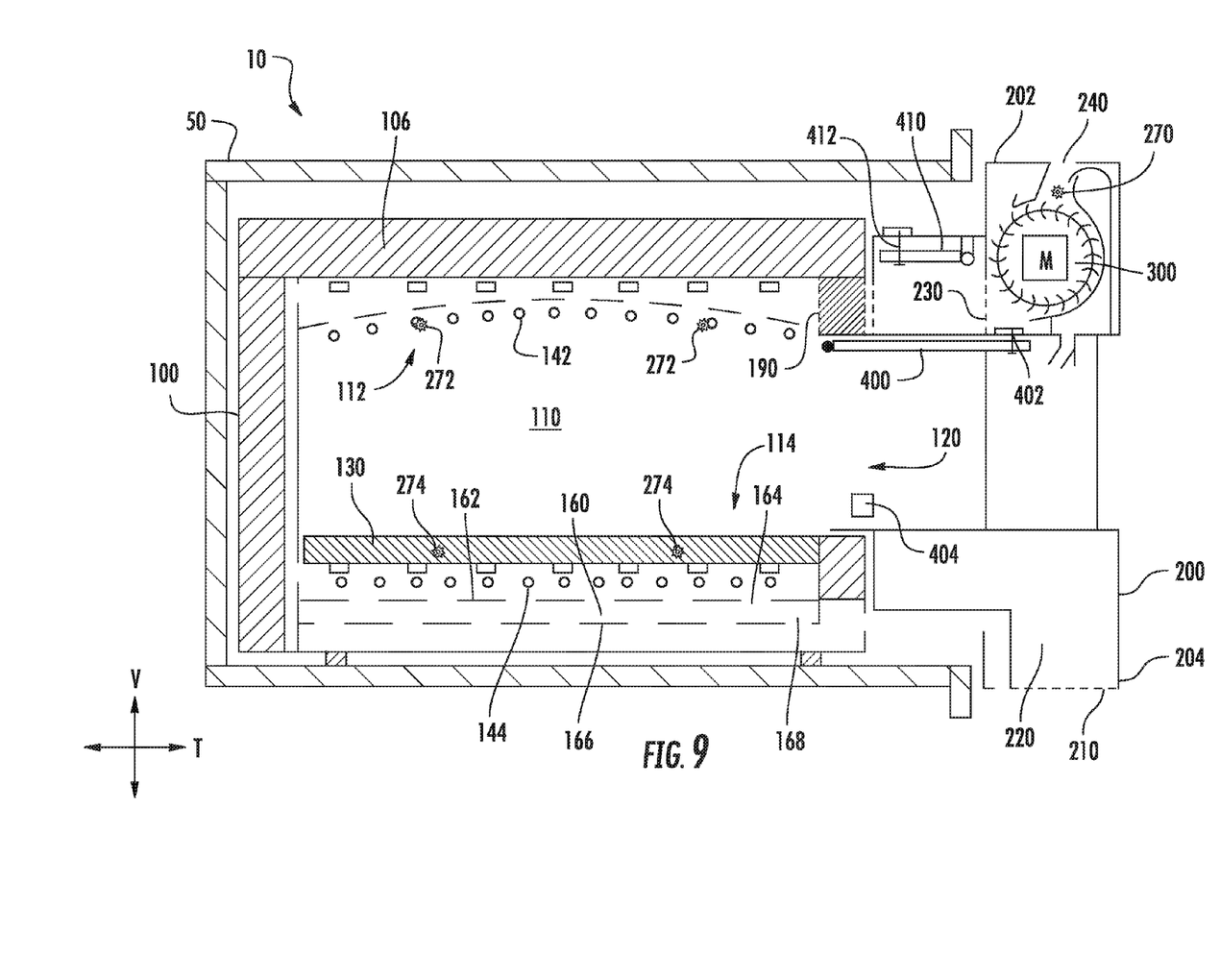
FIGS. 9 and 10 provide side section views of yet another exemplary embodiment of the oven appliance positioned within a cabinet.
Figure 10:
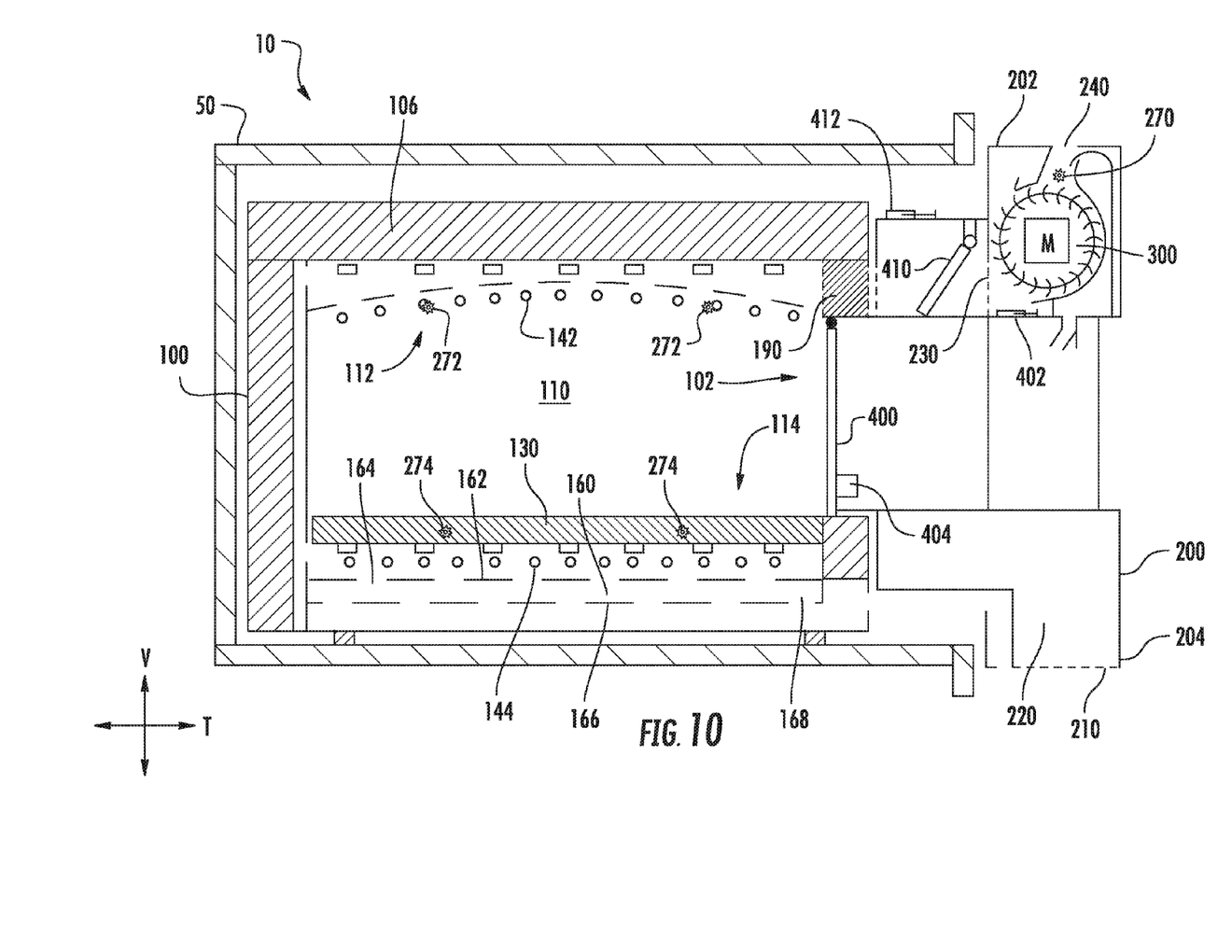
Figure 11:
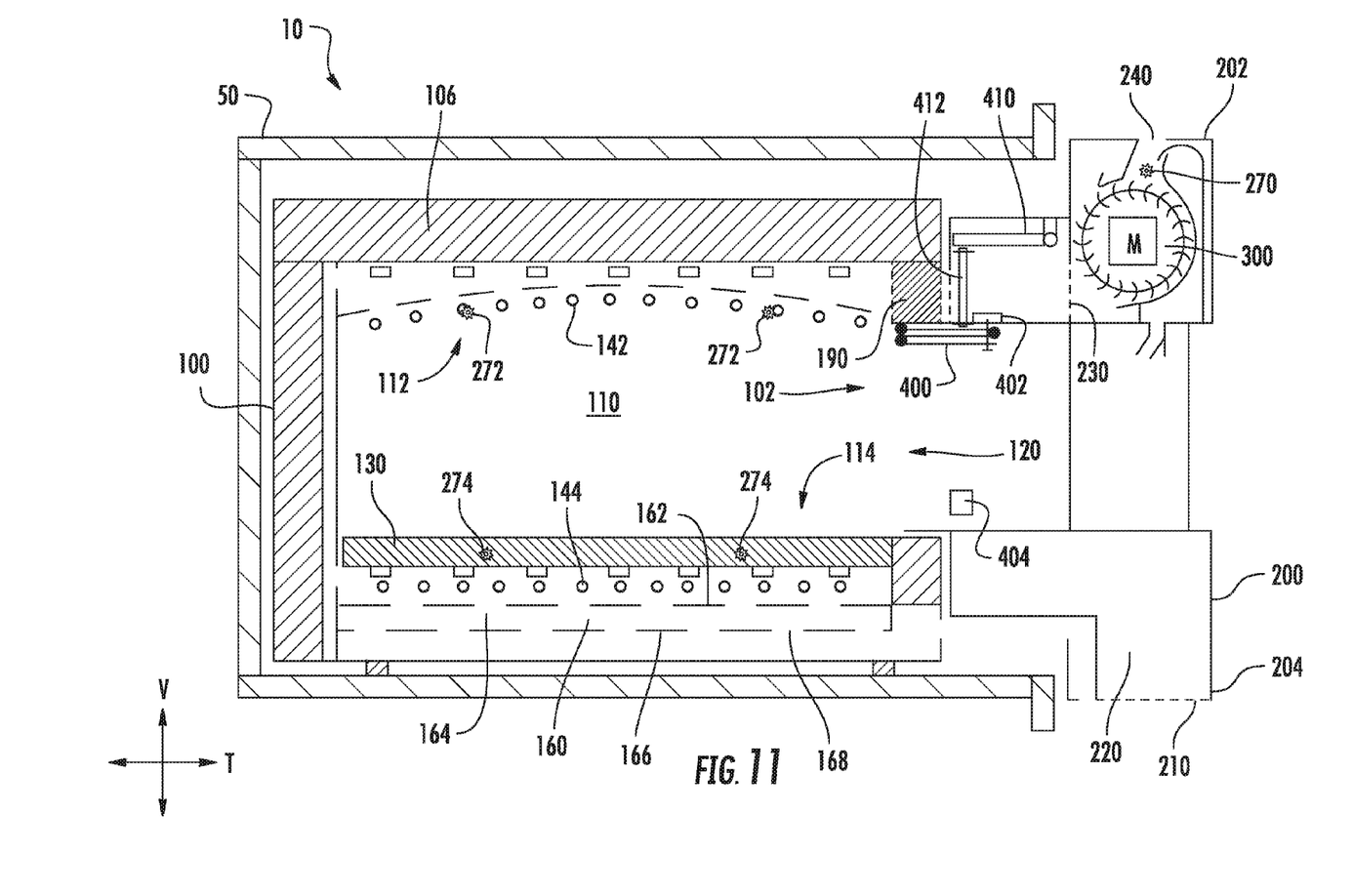
FIG. 11 provides a side section view of yet another exemplary embodiment of the oven appliance positioned within a cabinet.

FIGS. 9 and 10 illustrate features in some exemplary embodiments wherein the second door retaining mechanism 412 is provided as a latch similar to door retaining mechanism 402. In some exemplary embodiments, as illustrated in FIG. 11, door 400 provided as an accordion-style folding door can be combined with a second door 410 and second door retaining mechanism 412, such as those illustrated in FIG. 11.

Oven appliance 10 also includes a controller 600 for providing desired functionality for oven appliance 100. For instance, as will be described below, the controller 600 may be configured to control the activation and deactivation of upper and lower heating element arrays 142, 144 in order to regulate heating of cooking chamber 110 with upper and lower heating element arrays 142, 144. For instance, by controlling the operation of the upper and lower heating element arrays 142, 144, the controller 600 may be configured to control the various operating modes of the oven appliance 10, such as baking, roasting, broiling, cleaning and/or any other suitable operations, as well as to provide a shutdown mode if an operating mode exceeds certain parameters.

It should be appreciated that controller 600 may generally comprise any suitable processor-based device known in the art. Thus, in several exemplary embodiments, controller 600 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory of controller 600 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store suitable computer-readable instructions that, when implemented by the processor(s), configure controller 600 to perform various computer-implemented functions, such as by implementing exemplary embodiments of the operating algorithm disclosed herein. In addition, controller 600 may also include various other suitable components, such as a communications circuit or module, one or more input/output channels, a data/control bus and/or the like.

Turning back to FIG. 1, oven appliance 10 may also include a control panel 602 on casing 200. Control panel 602 may include one or more user-interface elements 604 (e.g., buttons, knobs, etc.) for receiving user inputs associated with controlling the operation of oven appliance 10. For instance, a user may utilize the user-interface elements 604 to input a desired oven temperature into controller 600. Controller 600 may then control the operation of oven appliance 10 (e.g., by activating/deactivating one or more of the upper heating element array 142 and the lower heating element array 144) so as to adjust the internal temperature within cooking chamber 110 of housing 100 to the user-selected temperature, to maintain the internal temperature at such user-selected temperature, and/or to ensure the oven appliance 10 is operating within safe limits.

Moreover, controller 600 may be communicatively coupled to one or more temperature sensors 270, 272, and/or 274, e.g., for monitoring the internal temperature within cooking chamber 110 of housing 100. Specifically, in some exemplary embodiments upper temperature sensors 272 and/or lower temperature sensors 274 may be configured to transmit heater surface temperature measurements to controller 600. In some exemplary embodiments, first temperature sensor 270 may be configured to transmit exhaust temperature measurements to controller 600 instead of or in addition to upper temperature sensors 272 and/or lower temperature sensors 274. Controller 600 may then control the operation of the upper heating element array 142 and lower heating element array 144 based on the temperature measurements so as to heat the oven temperature up to and/or maintain such temperature at the user-selected temperature, as well as to ensure the oven appliance 10 is operating within safe limits, as will be discussed in more detail below.

Controller 600 may be configured to compare the sensed temperature with a threshold value and to shut down the oven appliance 10 if the sensed temperature meets or exceeds the threshold value (e.g., to place the oven appliance 10 in shutdown mode). Shutting down the oven appliance 10 can include deactivating the upper heating element array 142 and the lower heating element array 144, deactivating the air handler 300, and closing the door 400 by deactivating door retaining mechanism 402 (e.g., releasing the door retaining mechanism so that the door drops down into the closed position). In some exemplary embodiments, the threshold value can be defined by a maximum rate of temperature increase and the threshold condition triggering shut down of the oven appliance 10 can be reached when the sensed temperature increases at a rate that exceeds the maximum rate of temperature increase. In some exemplary embodiments, the threshold value can be defined by a maximum temperature and the threshold condition triggering shut down of the oven appliance 10 can be reached when the sensed temperature exceeds the maximum temperature. Thus, the controller 600 can be configured to shut down the oven appliance 10 in response to an imminent or active undesirable condition based on the sensed temperature signal received from the temperature sensors 270, 272, and/or 274, which can be determined based on an instantaneous temperature reading and/or a rate of change in the temperature over time.

Accordingly, in various exemplary embodiments, controller 600 is in operative communication with upper heating element array 142, lower heating element array 144, one or more temperature sensors 270, 272, and/or 274, air handler 300, and at least one door retaining mechanism 402 and/or 412. Additionally, in some exemplary embodiments, controller 600 can be in operative communication with door locking mechanism 404.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
a housing defining a cooking chamber, the housing also defining an opening for accessing the cooking chamber of the housing;
an upper heating element array positioned within the housing at a top portion of the cooking chamber;
a baking stone positioned within the housing at a bottom portion of the cooking chamber;
a lower heating element array positioned within the housing below the baking stone adjacent the bottom portion of the cooking chamber;
a hollow casing positioned around the opening of the housing, the casing comprising an intake contiguous with an ambient atmosphere about the housing and a venting exit contiguous with the ambient atmosphere about the housing;
an air handler operable to draw air from the ambient atmosphere into the casing via the intake and discharge air from the casing to the ambient atmosphere via the venting exit;
a temperature sensor;
a first door selectively adjustable between an open position and a closed position, the first door restricting fluid communication between the ambient atmosphere and the cooking chamber when the first door is in a closed position;
a first door retaining mechanism operable to retain the first door in the open position such that the first door permits fluid communication between the ambient atmosphere and the cooking chamber;
a second door positioned between the cooking chamber and the hollow casing such that the second door restricts fluid communication between the ambient atmosphere and the cooking chamber through a plenum space within the hollow casing when the second door is in a closed position;
a second door retaining mechanism operable to retain the second door in an open position, the second door retaining mechanism engaged by the first door when the first door is in the open position such that the second door retaining mechanism holds the second door in the open position, and the second door retaining mechanism is disengaged from the first door when the first door is in the closed position such that the second door retaining mechanism releases the second door when the first door closes; and a controller operatively connected to the upper heating element array, the lower heating element array, the first door retaining mechanism, the air handler, and the temperature sensor, the controller configured to receive a signal from the temperature sensor and, in response to the signal, to deactivate the upper heating element array, the lower heating element array, and the air handler and to release the first door retaining mechanism.

2. The oven appliance of claim 1, further comprising a lock configured to automatically lock the first door in the closed position.

3. The oven appliance of claim 1, wherein the first door is positioned proximate to the opening of the housing such that the first door restricts fluid communication between the ambient atmosphere and the cooking chamber through the opening when the first door is in the closed position.

4. The oven appliance of claim 1, wherein the first door is an accordion door comprising a plurality of hinged panels, the first door retaining mechanism is a latch, the first door configured to close by unfolding in a vertical direction across the opening when the latch is released.

5. The oven appliance of claim 1, wherein the first door comprises a panel and a hinge along one side of the panel, the first door retaining mechanism is a latch, the first door configured to close by rotating about the hinge when the latch is released.

6. The oven appliance of claim 5, wherein the first door is positioned proximate the opening.

* * * * *